United States Patent
Fuchs et al.

(12) 
(10) Patent No.: US 6,568,414 B1
(45) Date of Patent: May 27, 2003

(54) ARRANGEMENT FOR CLEANING THE MIRROR ELEMENT OF AN OUTSIDE REAR VIEW MIRROR

(75) Inventors: Hans-Joachim Fuchs, Dorfprozelten (DE); Peter Fuerst, Bürgstadt (DE); Herwig Polzer, Miltenberg (DE)

(73) Assignee: Donnelly Hohe GmbH & Co. KG (DE)

( * ) Notice: Subject to any disclaimer, the term of this patent is extended or adjusted under 35 U.S.C. 154(b) by 0 days.

(21) Appl. No.: 09/597,677

(22) Filed: Jun. 20, 2000

(30) Foreign Application Priority Data

Jun. 21, 1999 (DE) .......................................... 199 28 355

(51) Int. Cl.⁷ ................................................ B08B 3/02
(52) U.S. Cl. ..................... 134/199; 15/250.003; 15/313; 239/284.1; 359/507; 359/509
(58) Field of Search ............................... 134/123, 198; 15/250.003, 313; 239/284.1; 359/507, 509

(56) References Cited

U.S. PATENT DOCUMENTS 5,572,376 A * 11/1996 Pace .......................... 359/887

FOREIGN PATENT DOCUMENTS

| FR | 2661380 | * 10/1991 | ............ 15/250.003 |
| JP | 149246 | * 6/1988 | ............ 15/250.003 |

* cited by examiner

Primary Examiner—Philip R. Coe
(74) Attorney, Agent, or Firm—McGlew and Tuttle, P.C.

(57) ABSTRACT

An arrangement for cleaning the mirror element of an outside rear view mirror is disclosed. The arrangement includes a washing nozzle, which is disposed in the region of the outside rear view mirror on a motor vehicle and from which a jet of a cleaning liquid may be discharged. The position of the mirror element (1) relative to the body of the motor vehicle is variable, whereas the washing nozzle (9) is connected in a fixed manner to the body. To improve the cleaning action of the washing to nozzle (9), the mirror element (2) may be adjusted between a normal position, in which the driver may observe the traffic behind him in the mirror element (2), and a cleaning position, in which an advantageous angle for cleaning, in particular a steep angle arises between the mirror plane of the mirror element (2) and the jet of cleaning liquid.

26 Claims, 2 Drawing Sheets

ARRANGEMENT FOR CLEANING THE MIRROR ELEMENT OF AN OUTSIDE REAR VIEW MIRROR

FIELD OF THE INVENTION

The invention relates to an arrangement for cleaning the mirror element of an outside rear view mirror with a washing nozzle, the position of the mirror element being variable relative to the body of the motor vehicle, which is disposed in the region of the outside rear view mirror on a motor vehicle and from which a jet of a cleaning liquid may be discharged.

BACKGROUND OF THE INVENTION

Because of the arrangement of the outside rear view mirrors in the side region of a motor vehicle, the mirror elements become dirty relatively quickly, particularly under adverse weather conditions such as rain or when the roads have been salted. Dirt on the mirror element impairs the driver's view of the traffic behind and therefore reduces driving safety. When a specific amount of dirt is exceeded, the mirror elements have to be cleaned, which may be effected either by hand or when the car is washed in a car wash.

Since, because of the unfavorable geometry of outside rear view mirrors, the mirror elements are not properly cleaned in the car wash and cleaning by hand is an inconvenient, time-consuming and dirty process, automatic cleaning systems corresponding to the cleaning systems for cleaning front headlamps have been developed for cleaning outside rear view mirrors. For this purpose it is possible to use, for example, windshield (windscreen) wipers integrated in the outside rear view mirror or coatings which prevent dirt sticking to the glass surface. From prior art solutions are also known, in which washing nozzles are provided at various positions of the motor vehicle in order to apply a cleaning liquid for cleaning the mirror element.

A drawback of the known solutions for automatically cleaning the mirror element by means of washing nozzles is that in most types of motor vehicle the configuration of the body and of the rear view mirrors does not allow the washing nozzle to be disposed in such a way as to achieve an effective cleaning action by virtue of an advantageous jet angle and a relatively short distance from the mirror element. When the washing nozzle is disposed e.g. in the mirror ring or bezel area, the flat jet angle in relation to the mirror element produces only an inadequate cleaning action. Solutions involving the use of windshield wipers have an adverse effect upon the visible surface, adjustment options and positioning accuracy. Coating of the surface of the mirror glass also occasionally produces only unsatisfactory results, especially when a mist of dirt settles on the glass and is additionally dried on by a mirror glass heating is system.

SUMMARY AND OBJECTS OF THE INVENTION

The object of the present invention is to propose an arrangement for cleaning the mirror element of an outside rear view mirror which enables an improved cleaning action.

According to the invention, the washing nozzle is connected in a fixed manner to the body of the vehicle and the mirror element is adjustable at least between a normal position and a cleaning position. This means that the washing nozzle is disposed at a point of the motor vehicle, the position of which is independent of the position of the mirror element. The normal position of the mirror element is the position, in which the driver may observe the traffic behind him in the mirror element. In said case it is self-evident that, depending on the needs of the respective driver, there are various normal positions within a specific range of adjustment. The cleaning position is notable for the fact that in the cleaning position an advantageous angle for cleaning the mirror element, in particular a steep angle arises between the mirror plane of the mirror element and the jet of cleaning liquid. In consequence, the arrangement according to the invention allows the mirror element to be moved out of a normal position into a cleaning position, in which it adopts a position relative to the washing nozzle which is advantageous for cleaning. Depending on the respective type of vehicle, for use of the arrangement according to the invention it is necessary to find first a place to put the washing nozzle and then an adjusting mechanism for moving the mirror element out of the normal position into a cleaning position which is advantageous for the specific arrangement of the washing nozzle. The manner, in which the mirror element is adjusted between the two positions, is immaterial according to the invention. Thus, the mirror element may be adjusted individually or alternatively together with a surrounding mirror housing.

The washing nozzle may in principle be disposed at any desired point of the motor vehicle. It is conceivable to fasten the washing nozzle in the door panel or a rubber profile. Particularly inexpensive assembly is enabled when the washing nozzle is disposed on a mirror base (or mirror foot) and/or mirror base cover. Thus, the washing nozzle may be installed already during preassembly of the various components of an outside rear view mirror so that, when the outside rear view mirror is fitted on the motor vehicle, all that remains is to connect the washing nozzle to the cleaning liquid system of the vehicle. Such connection may be effected by means of conventional liquid-tight flexible tube connections or alternatively by means of coupling devices, which immediately upon fitting of the mirror through simple attachment establish a liquid-proof plug-in connection.

In most modern motor vehicles, the mirror base and/or mirror base cover whereby the exterior mirror assembly attaches to the vchicle forms the window triangle of one of the front side windows in the motor vehicle. Said window triangle need not necessarily have three proper points, rather the points of the window triangle may be flattened, rounded or cut off in accordance with the geometry of the vehicle and/or side window. What is meant by a window triangle in the context of the present invention is therefore the part of the vehicle, against which the front edge of the side window is guided and at which the window aperture terminates in the direction of the front of the vehicle. When the mirror base and/or mirror base cover forms such a window triangle, it is particularly advantageous when the washing nozzle is disposed in the region of the upwardly directed point of the window triangle. Here too, the upwardly directed point of the window triangle need not be a proper point but may alternatively have a rounded- or flattened-off shape. By virtue of disposing the washing nozzle in said region, it is possible in most cases to avoid having to increase the size of the window triangle in order to fasten the washing nozzle. Advantageous cleaning positions for the mirror element moreover arise as a result of the arrangement in said region.

In principle, it is immaterial whether the mirror element is adjusted between the normal position and the cleaning position by hand or with the aid of drive motors. For increased convenience when cleaning the mirror elements and in particular to rule out the risk of the driver getting dirty while effecting the adjustment between the two positions, the mirror element should be adjustable between the normal position and the cleaning position preferably by means of a remote-controllable drive unit.

As a result, it is therefore possible to effect cleaning of the mirror element without having to leave the vehicle.

In many types of vehicle, the outside rear view mirrors are provided with a fold-in mechanism such as a powerfold mechanism as known in the art, by means of which the housing of the outside rear view mirror may be swivelled into a folded-in position next to the vehicle body. The outside rear view mirror is therefore protected from damage caused e.g., by passing bikes or motor vehicles. As a movement of the mirror element relative to the body is also effected by the known fold-in mechanisms, it is particularly advantageous when such a fold-in mechanism is used also as a drive unit for effecting the adjustment according to the invention between cleaning position and normal position of the mirror element. It is therefore possible to dispense with a separate drive unit for said task.

When the fold-in mechanism, like the fold-in mechanisms known from prior art, comprises only one swivelling axis, the positioning options for the arrangement of the washing nozzle are extremely limited. When the outside rear view mirror during inward folding is for example, as is normally the case, merely swivelled about a vertical axis, the washing nozzle has to be disposed in a region of the vehicle door behind the mirror base. While an arrangement in said region is possible in principle, e.g., in the vehicle panel, it is disadvantageous on account of the fastening means needed for said purpose, e.g., punching a hole in the vehicle panel. This problem may be solved when the housing of the outside rear view mirror may be swivelled by the fold-in mechanism about at least two swivelling axes. This gives rise to a plurality of positioning options so that the washing nozzle may be positioned at an advantageous spot and, in dependence upon said position, an advantageous cleaning position of the mirror element is adjustable.

When the cleaning nozzle is disposed e.g., in the region of the upwardly directed point of a window triangle, an advantageous cleaning position of the mirror element may be adjusted in that the housing is first swivelled in a conventional manner about a vertical axis into a position next to the body and then swivelled about a horizontal axis. In consequence, the mirror plane in such cleaning position extends from below obliquely upwards and outwards, while the mirror surface is directed upwards. In such position the mirror element may be cleaned effectively by a water jet of the water nozzle disposed in the window triangle.

In an alternative refinement, only a single swivelling axis of a fold-in mechanism is provided, which extends in an inclined manner relative to the vertical axis. In this case, the angle of inclination of the swivelling axis is preferably between 30° and 60°, in particular substantially around 45°. Thus, on the one hand the mirror may be folded in so as to be substantially next to the body and on the other hand this mirror position, which is simultaneously the cleaning position, enables an, in terms of assembly, advantageous arrangement of the washing nozzle in the region of the mirror base.

To boost the cleaning action, it is advantageous to use pulsating water nozzles because, with such water nozzles, substantially the entire area of a mirror glass may be covered and cleaned.

To prevent the cleaning liquid from freezing at temperatures below freezing point, the washing nozzle may be designed so as to be heatable.

The cleaning effect of the arrangement according to the invention may also be boosted by coating the mirror surface with a hydrophobic and/or dirt-repelling layer so that, in particular, the long-term effect of a cleaning operation is increased and the removal of dirt particles from the surface of the mirror glass is facilitated.

According to a further refinement of the invention, the washing nozzle and/or a pump supplying the washing nozzle with the cleaning liquid is coupled in such a way to a device, which determines the position of the side window in front of which the outside rear view mirror is disposed, that a discharge of cleaning liquid through the washing nozzle is effected only when the window is substantially closed. By such means, cleaning liquid is prevented from passing into the interior of the vehicle during cleaning of the rear view mirror. The device determining the position of the side window may be, for example, part of an electric window lifter.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
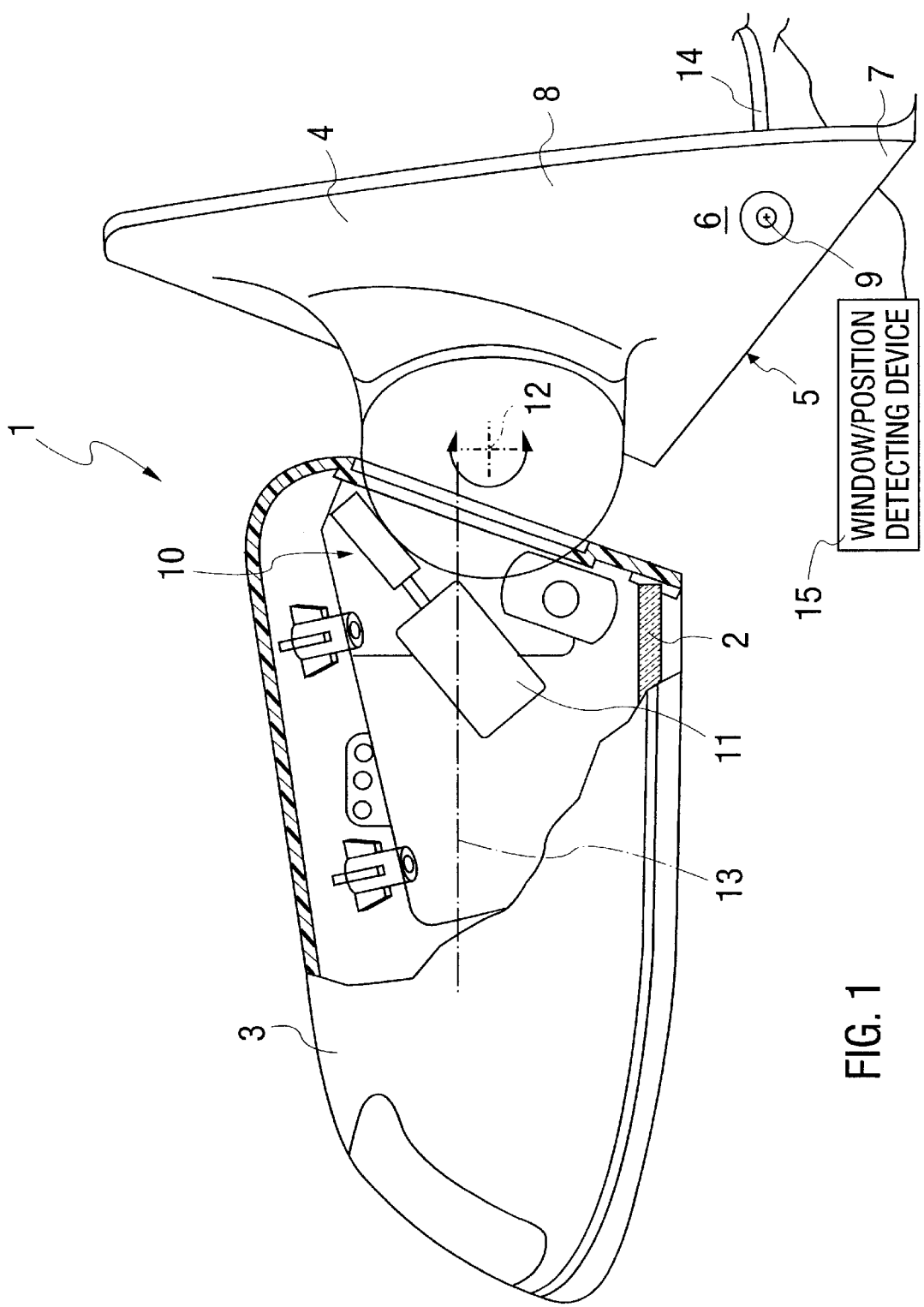
FIG. 1 is a perspective plan view of the arrangement according to the invention.

Referring to the drawings in particular, FIG. 1 shows an outside rear view mirror 1 comprising a mirror element 2, a mirror housing 3 and a mirror foot 4. The mirror foot 4 is designed in such a way that it forms the window triangle of a side window, wherein the front edge of the side window pane extends in the region of the edge 5. Disposed in the region 6 of the upwardly directed point 7 of the window triangle 8 is a washing nozzle 9, from which a jet of cleaning liquid may be discharged. The cleaning liquid required for this purpose is fed from a non-illustrated cleaning liquid system through an only partially illustrated tube 14 to the washing nozzle 9. A side window position detecting device can determine the position of the side window in front of which the outside rear view mirror is disposed. The washing nozzle 9 and/or a pump supplying the washing nozzle with the cleaning liquid may be coupled in such a way, to the position detecting device, that a discharge of cleaning liquid through the washing nozzle is effected only when the window is substantially closed. The outside rear view mirror 1 is equipped with a fold-in mechanism 10, by means of which the housing 3 and the mirror element 2 may be swivelled relative to the mirror foot 4. Through operation of a drive motor 11 a swivelling motion about the vertical axis 12 is effected and through operation of a second, non-illustrated drive motor a swivelling motion about a horizontal axis 13 is effected. The two drive motors may moreover be controlled remotely from the interior of the vehicle.

Figure 2:
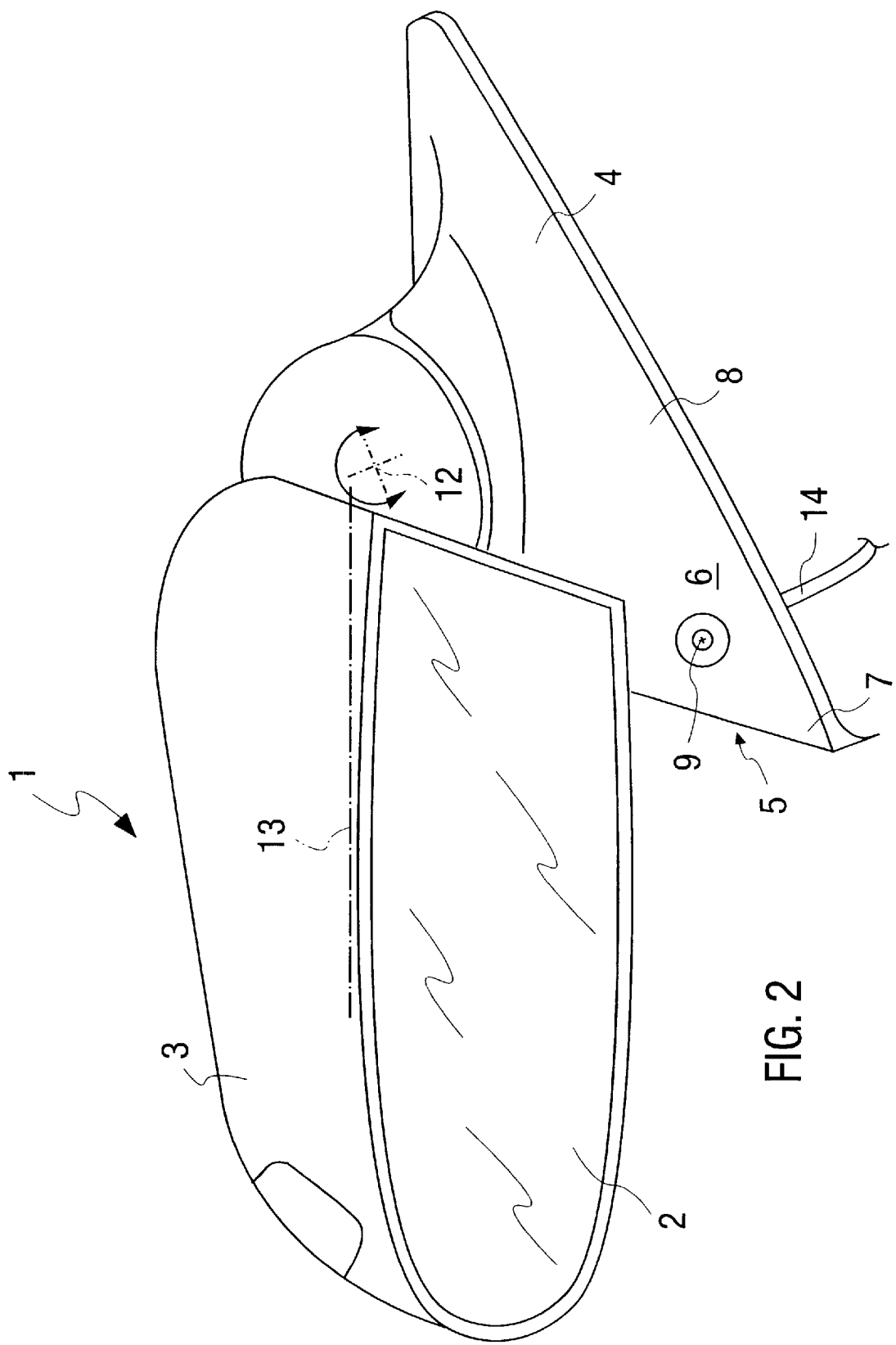
FIG. 2 is a schematic view showing the angle of inclination of the swivelling axis of 45° (between 30° and 60°).

When the housing 3 is to be moved out of the normal position shown in FIG. 1 into the folded-in position, only the drive motor 11 is activated so that the housing 3 swivels about the vertical axis 12 and may be positioned next to the body of the vehicle. To achieve the cleaning position required for cleaning the mirror element 2 with the aid of the washing nozzle 9, after attainment of the folded-in position the second drive motor is activated and the housing 3 is moved out of the folded-in position by swivelling about the horizontal axis 13 into the cleaning position. In the cleaning position the mirror surface of the mirror element 2 points upwards, while the mirror element extends from below obliquely upwards and outwards. This position leads to an advantageous angle between the mirror surface of the mirror element 2 and the washing nozzle 9 so that the mirror element 2 may be cleaned effectively through application of a jet of liquid. As shown in FIG. 2, the angle of inclination of the swivelling axis is between 30° and 60°, such as 45°.

While specific embodiments of the invention have been shown and described in detail to illustrate the application of the principles of the invention, it will be understood that the invention may be embodied otherwise without departing from such principles.

What is claimed is:

1. An arrangement for cleaning the mirror element of an outside rear view mirror, the arrangement comprising:
    a washing nozzle disposed in the region of the outside rear view mirror on a motor vehicle, said nozzle for discharging a jet of a cleaning liquid, whereby the position of the mirror element is variable relative to the body of the motor vehicle, wherein the washing nozzle is connected in a fixed manner to the body and the mirror element is adjustable at least between a normal position, in which the driver may observe the traffic behind him in the mirror element and a cleaning position, in which an advantageous angle for cleaning arises between the mirror plane of the mirror element and the jet of cleaning liquid; and
    a remote-controllable drive unit designed in the manner of a fold-in mechanism, wherein by means of said fold-in mechanism a housing of the outside rear view mirror may be swivelled about at least two swivelling axes from a normal position into a folded-in cleaning position next to the body.

2. An arrangement as claimed in claim 1, wherein the washing nozzle is disposed on a mirror base and/or mirror base cover.

3. An arrangement as claimed in claim 2, wherein the mirror base and/or mirror base cover form a window triangle of a vehicle side window and the washing nozzle is disposed in a region of an upwardly directed window triangle point.

4. An arrangement as claimed in one of claim 1, wherein the mirror element is adjustable between the normal position and the cleaning position by means of a remote-controllable drive unit.

5. An arrangement as claimed in claim 1, wherein the swivelling axis of the fold-in mechanism extends substantially vertically.

6. An arrangement as claimed in claim 1, wherein the outside mirror by swivelling about the first swivelling axis is movable out of the normal position into the folded-in position and by swivelling about both swivelling axes is movable out of the normal position into the cleaning position.

7. An arrangement for cleaning the mirror element of an outside rear view mirror, the arrangement comprising:
    a washing nozzle disposed in the region of the outside rear view mirror on a motor vehicle, said nozzle for discharging a jet of a cleaning liquid, whereby the position of the mirror element is variable relative to the body of the motor vehicle, wherein the washing nozzle is connected in a fixed manner to the body and the mirror element is adjustable at least between a normal position, in which the driver may observe the traffic behind him in the mirror element and a cleaning position, in which an advantageous angle for cleaning arises between the mirror plane of the mirror element and the jet of cleaning liquid, and a drive unit designed in the manner of a fold-in mechanism and by means of said fold-in mechanism a housing of the outside rear view mirror may be swivelled about at least two swivelling axes into a folded-in position next to the body wherein the swivelling axis of the fold-in mechanism extends in an inclined manner relative to the vertical axis and the angle of inclination of the swivelling axis is between 30° and 60°.

8. An arrangement as claimed in claim 7, wherein the angle of inclination of the swivelling axis is substantially 45°.

9. An arrangement as claimed in claim 7, wherein said nozzle is a pulsating washing nozzle.

10. An arrangement as claimed in claim 1, wherein said washing nozzle is heated.

11. An arrangement for cleaning the mirror element of an outside rear view mirror, the arrangement comprising:
    a washing nozzle disposed in the region of the outside rear view mirror on a motor vehicle, said nozzle for discharging a jet of a cleaning liquid, whereby the position of the mirror element is variable relative to the body of the motor vehicle, wherein the washing nozzle is connected in a fixed manner to the body and the mirror element is adjustable at least between a normal position, in which the driver may observe the traffic behind him in the mirror element and a cleaning position, in which an advantageous angle for cleaning arises between the mirror plane of the mirror element and the jet of cleaning liquid; and
    a side window position detecting device which determines the position of the side window in front of which the outside rear view mirror is disposed, wherein said washing nozzle and/or a pump supplying the washing nozzle with the cleaning liquid are coupled in such a way to said position detecting device, that a discharge of cleaning liquid through the washing nozzle is effected only when the window is substantially closed.

12. An arrangement as claimed in claim 11, wherein the mirror surface is coated with a hydrophobic and/or dirt repelling layer.

13. An arrangement as claimed in claim 7, wherein the washing nozzle is disposed on a mirror base and/or mirror base cover.

14. An arrangement as claimed in claim 13, wherein the mirror base and/or mirror base cover form a window triangle of a vehicle side window and the washing nozzle is disposed in a region of the upwardly directed point of the window triangle.

15. An arrangement as claimed in one of claim 7 wherein the mirror element is adjustable between the normal position and the cleaning position by means of a remote-controllable drive unit.

16. An arrangement as claimed in claim 7, wherein the swivelling axis of the fold-in mechanism extends substantially vertically.

17. An arrangement as claimed in claim 7, wherein the outside mirror by swivelling about the first swivelling axis is movable out of the normal position into the folded-in position and by swivelling about both swivelling axes is movable out of the normal position into the cleaning position.

18. An arrangement as claimed in claim 7, wherein said washing nozzle is heated.

19. An arrangement as claimed in claim 7, wherein the mirror surface is coated with a hydrophobic and/or dirt repelling layer.

20. An arrangement as claimed in claim 11, wherein the washing nozzle is disposed on a mirror base and/or mirror base cover.

21. An arrangement as claimed in claim 20, wherein the mirror base and/or mirror base cover form a window triangle of a vehicle side window and the washing nozzle is disposed in a region of the upwardly directed point of the window triangle.

22. An arrangement as claimed in one of claim 11 wherein the mirror element is adjustable between the normal position and the cleaning position by means of a remote-controllable drive unit.

23. An arrangement as claimed in claim 11, wherein the swivelling axis of the fold-in mechanism extends substantially vertically.

24. An arrangement as claimed in claim 11, wherein the outside mirror by swivelling about the first swivelling axis is movable out of the normal position into the folded-in position and by swivelling about both swivelling axes is movable out of the normal position into the cleaning position.

25. An arrangement as claimed in claim 11, wherein said nozzle is a pulsating washing nozzle.

26. An arrangement as claimed in claim 11, wherein said washing nozzle is heated.

* * * * *